United States Patent [19]

Sutphen

[11] Patent Number: 4,913,039
[45] Date of Patent: Apr. 3, 1990

[54] STEAM GENERATOR COOKER

[76] Inventor: Cecil Sutphen, 2424 N. Grant Blvd., Milwaukee, Wis. 53210

[21] Appl. No.: 213,829

[22] Filed: Jun. 30, 1988

[51] Int. Cl.4 .......................... A47J 37/04; A47J 37/07
[52] U.S. Cl. ........................................ 99/339; 99/417; 99/402; 99/410; 99/413; 220/366
[58] Field of Search ................ 99/339, 385, 399, 400, 99/402, 417, 410, 413; 220/203, 208, 209, 211, 216, 220, 366, 240, 351

[56] References Cited

U.S. PATENT DOCUMENTS

| | | | |
|---|---|---|---|
| 2,510,856 | 6/1950 | Bettencourt | 99/400 |
| 2,790,434 | 4/1957 | Del Francia | 99/339 X |
| 2,845,059 | 7/1958 | Kelleher | 220/366 X |
| 3,109,359 | 11/1963 | Falla | 99/339 |
| 3,212,426 | 10/1965 | Lewus | 99/339 |
| 3,217,634 | 11/1965 | Fox | 99/339 |
| 3,289,571 | 12/1966 | Lewus | 99/339 |
| 3,299,800 | 1/1967 | Angelo | 99/417 |
| 3,439,831 | 4/1969 | Pullen | 220/366 X |
| 3,593,647 | 7/1971 | Copeland, Jr. | 99/339 |
| 4,094,295 | 6/1978 | Boswell et al. | 99/417 X |
| 4,344,358 | 8/1982 | Maurer | 99/476 |
| 4,467,709 | 8/1984 | Anstedt | 99/352 X |
| 4,495,860 | 1/1985 | Hitch et al. | 99/417 X |
| 4,548,193 | 10/1985 | Marogil | 126/25 A X |
| 4,632,089 | 12/1986 | Wardell | 99/450 X |
| 4,672,944 | 6/1987 | Curry | 99/339 X |
| 4,677,905 | 7/1987 | Johnson | 99/413 |
| 4,759,276 | 7/1988 | Segroues | 99/339 |

Primary Examiner—Stephen Marcus
Assistant Examiner—Christine A. Peterson
Attorney, Agent, or Firm—Quarles & Brady

[57] ABSTRACT

A cooking apparatus capable of barbecuing and steaming food which includes a steam generating chamber and a heat source to both generate steam and brown the cooked food. In a preferred manner, the steam generating chamber is connected to a water supply source and a lid on the chamber is of the floating type. The cooking apparatus lends itself to the usual heat sources and can be accommodated in a modular cooking unit.

12 Claims, 1 Drawing Sheet

U.S. Patent  Apr. 3, 1990  4,913,039
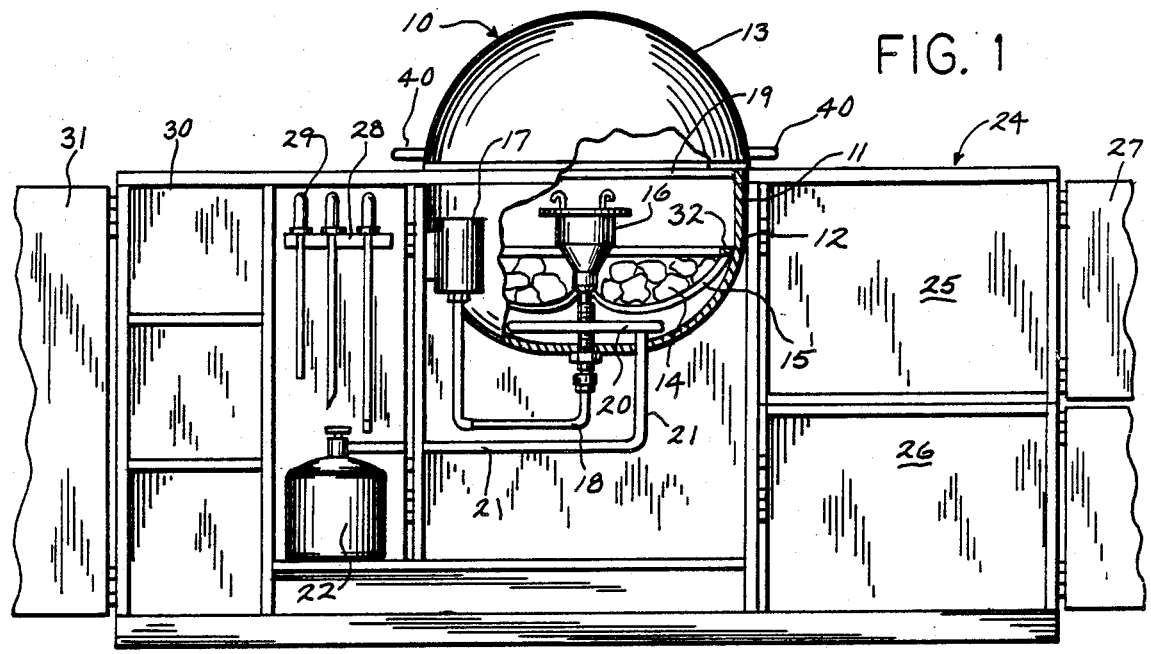
FIG. 1
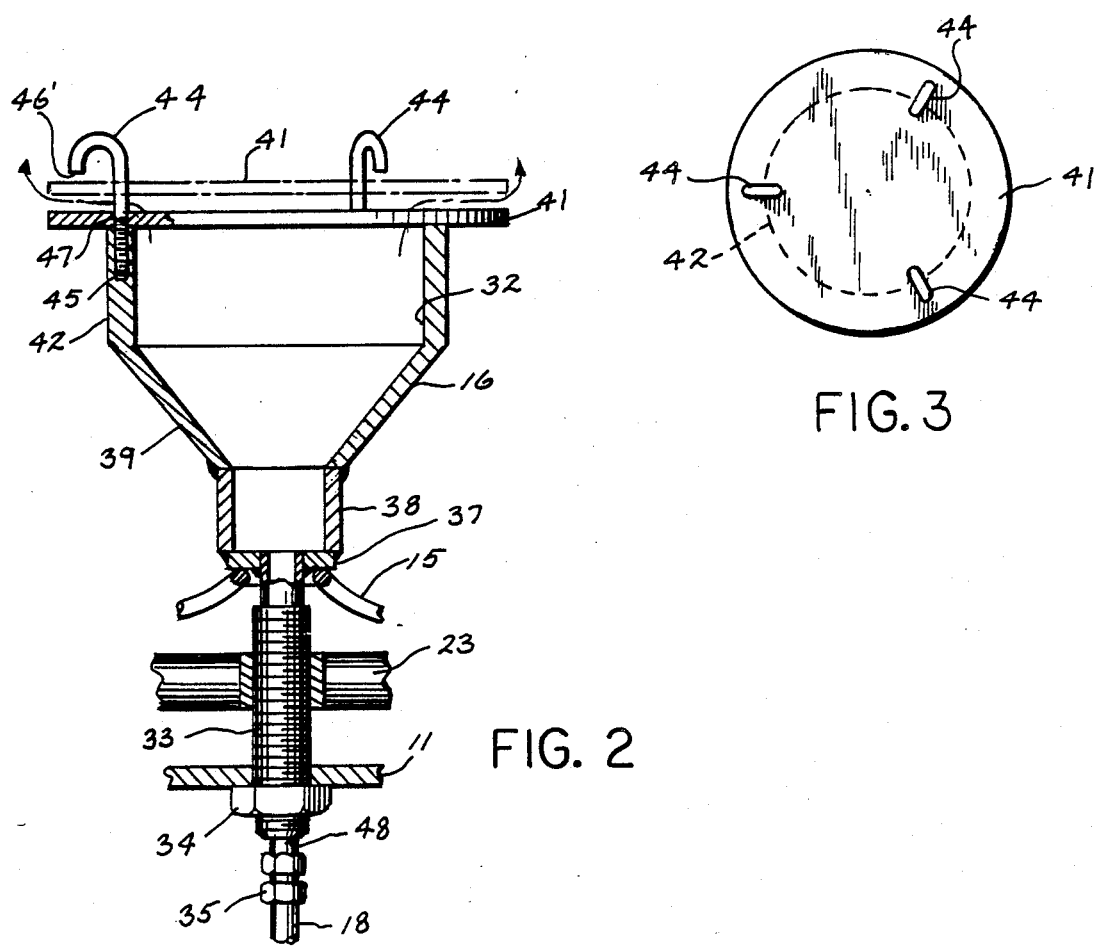
FIG. 2
FIG. 3

STEAM GENERATOR COOKER

BACKGROUND OF THE INVENTION

This invention relates to a cooking apparatus which can both provide a source of steam heat for cooking as well as an additional source of heat such as from the usual fuel sources. More particularly, this invention relates to an improved apparatus for steam cooking wherein a single source of heat provides steam generation as well as a means for browning meat.

It is known in the prior art to provide a source of steam heat for cooking various types of food items such as meat and vegetables. For example, in U.S. Pat. No. 3,109,359 a multicomponent unit is shown wherein a gas burner affords cooking of the articles with combustion products and steam or heated air and steam.

In U.S. Pat. No. 3,299,800 an open receptacle 30 is employed for applying steam heat for cooking purposes. This patent also mentions that the meat can be thoroughly browned. The use of open pans of water in conjunction with heat for cooking purposes are also described in U.S. Pat. Nos. 3,212,426 as well as 3,217,634.

The prior art does not provide a cooking apparatus wherein a steam generating chamber can be efficiently heated with a source of fuel so as to generate steam in a controlled manner. Neither does the prior art afford a combined steam and dry heat cooking apparatus wherein there is a constant supply of water to the steam generating chamber.

It is an advantage of the present invention to provide a combined steam and dry heat cooking apparatus wherein the dry heat is used to generate the steam in an efficient manner.

It is another advantage of this invention to provide a cooking apparatus of the foregoing type wherein the steam pressure can be efficiently controlled.

It is another advantage of the present invention to provide a cooking apparatus of the foregoing type wherein a constant supply of water is afforded to the steam generating device.

It is yet another advantage of the present invention to provide a cooking apparatus of the foregoing type which is adaptable to various types of dry heat sources.

Still another object of this invention is to provide a cooking apparatus of the foregoing type which can be easily accommodated in a cooking console or module.

SUMMARY OF THE INVENTION

The foregoing advantages are accomplished and the shortcomings of the prior art are overcome by the present cooking apparatus which is capable of barbecuing and steaming food. The apparatus includes an enclosure means for housing and supporting a source of heat and a grill for cooking the food. There is a support means for a heat source disposed inside the enclosure means. Further, there is a steam generating chamber for holding a quantity of water. The steam generating chamber and the support means for the fuel are constructed and arranged in a manner so that the fuel can surround the steam generating chamber and heat the water into steam with both the steam generator and the heat source positioned in a direct flow path to the food.

In a preferred manner, the support means for the heat source is provided by a basket member and the steam generating chamber is positioned in the center of the basket member.

In another preferred form, the steam generating chamber includes a base member for connection with a water supply means so as to provide a constant source of water.

Other preferred embodiments provide a floating lid for the steam generating chamber as well as a modular or console unit in which the apparatus forms a component part.

In yet another preferred embodiment, the steam generating chamber has wall means defining a receptacle for water with a lid member constructed and arranged to be positioned over the wall means in an upward direction. Hooks provide retention means mounted in the wall means and are constructed and arranged to permit limited movement of the lid member.

BRIEF DESCRIPTION OF THE DRAWINGS

A better understanding of the present cooking apparatus will be accomplished by reference to the drawing wherein:

FIG. 1 is a view in side elevation with parts broken away illustrating the cooking apparatus of this invention as a part of a console unit;

FIG. 2 is an enlarged view in vertical section showing a steam generating apparatus used in the cooking apparatus of FIG. 1; and FIG. 3 is a top view of the steam generating apparatus shown in FIG. 2.

DESCRIPTION OF THE PREFERRED EMBODIMENTS

Referring to FIG. 1, the cooking apparatus generally 10 includes an enclosure 11 with a base 12 and a cover 13. Positioned centrally in the base portion 12 is a steam generating chamber 16. A support basket 15 extends from the bottom of the steam generating chamber 16 and engages the base 12. Its purpose is to support either a fuel such as charcoal or lava rock 14. The steam generating chamber 16 is fed with water from a water supply tank 17 and the water supply line 18. A gas burner 20 is positioned below the basket 15 and is connected to a source of gas such as liquefied propane in the tank 22 by means of the gas line 21.

The cooking apparatus 10 is preferably housed in a modular type console generally 24. It includes a hot storage area 25 and a cold storage area 26. These are closed by the door 27. At the opposite side there is provided a support rack 28 for supporting a set of cooking tools 29. Additional storage can be provided in the sectional area 30 with these sections being closed by the door 31.

The details of the steam chamber 16 are best illustrated in FIGS. 2 and 3. It is seen that a hollow threaded section 33 provides a connection with the nut 34. The basket 15 extends from under the base wall 37 at its one end and is held against the base 12 such as at 32 at the other end. This securely holds the steam chamber 16 in position. The steam generator 16 has a hollow receptacle 32 provided by a cylindrical section 38 extending upwardly from the base wall 37. There is also a hollow frustco conical section 39 and an additional cylindrical wall section 42. Secured to the wall section 42 are three hooks 44 which are threaded such as by the threads 45 into the wall section 42. A cover 41 is placed over the top of the wall section 42 and has apertures such as at 47 so as to effect a sliding motion of the cover upwardly over the hooks 45 when steam is generated in the receptacle 32 of steam chamber 16. The curved end 46 of the hooks 44 afford a stopping means for the cover 41. Water is supplied to the receptacle 32 of chamber 16 by the line 18 which is interconnected to the nipple 48 of the threaded section 33 such as by the nut-type connection 35.

OPERATION

A better understanding of the features of the cooking apparatus 10 will be had a description of its use and operation. Lava rock such as indicated at 14 will be placed in the basket 15 and immediately adjacent the conical section 39 of the steam generating chamber 16. Heat is supplied by the gas burner 20 to heat the rock 14. Water is introduced into the receptacle 32 of the steam generating chamber 16 from the tank 17. Food articles whether meat or vegetables or both are placed on the cooking grid 19. In a typical sequence, the heat generated from the gas and the rock 14 will first brown the food on the grid. While the browning in taking place heat will begin to generate steam from the water in the steam generating chamber 16. As the pressure of the steam begins to build it lifts the cover 41. The movement of the cover 41 upwardly is limited by the stop surface 46 at the end of the hooks 44. This serves as an automatic temperature control and pressure control for the steam so that it is maintained at a temperature of approximately 350° F. During the cooking of the food articles with steam it will be seen that water will be constantly supplied to the steam generating chamber from the water supply tank 17.

An important feature of the cooking apparatus is the fact that a constant supply of water is provided to the steam generating chamber which at the same time has the ability to limit the temperature and the pressure of the steam by the limited movement of the cover 41. Another important aspect is the provision of the basket 15 with respect to the base of the steam generating chamber which supplies a maximum amount of heat at all times to the chamber through the conical portion 39. This conical portion is of even greater importance when instead of lava rock 14 being utilized as a source of heat that charcoal would be substituted. The charcoal would be positioned in the same manner as the lava rock. Accordingly as the charcoal would burn downwardly it would have a tendency to fill in and around the conical section and at the base thereof to afford maximum heat to the chamber 16.

Various alternatives are afforded for the cooking apparatus 10. As indicated above, either charcoal or a gas burner 20 and lava rock 14 can be employed as both a dry cooking means and a steam generating means. In place of the gas burner 20 an electric heating coil could be substituted. The cooking apparatus 10 is shown in combination with a modular console 24. If desired, it could be supported on a typical permanent stand or a portable cooking cart. While the conical portion 39 affords the previously indicated heat transfer it is within the scope of the invention to utilize a cylindrical base across the bottom of the wall section 42 which would have the same diameter as wall section 42. In this instance, the height of the wall section 42 would be approximately twice that shown in the FIG. 2 illustration. It should be pointed out that in conjunction with FIG. 1 there are shown the handles 40 which are shown to the sides of the cover 13. In a typical installation, the cover which is rounded would fit into a square-type base portion on the top of the console 24. The purpose of the side handles would be to encourage the user to open the cover from the sides and not from the front. This would avoid contact with the hot steam generated inside the cover 13.

It is also within the scope of this invention to provide a control panel with suitable controls for controlling water and gas flow in water line 18 and gas line 21. these cold be positioned on a panel section as a part of the console 24 and inside the doors 27 and 31. Also a flip up type cover could be provided on the top of the console to afford access to the water supply 17 so as to replenish the supply.

It will thus be seen that there is now provided an improved cooking apparatus .which affords both dry and moist heat in an efficient manner. The cooking apparatus is adaptable to various types of heating and affords efficient heat transfer from the heat source to the steam generating chamber. In addition to its versatility, the cooking apparatus of this invention does not require special tooling for its construction and therefore is economical to manufacture.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A cooking apparatus which is capable of barbecuing and steaming food comprising:
    enclosure means for housing and supporting a source of heat and a grid for cooking said food, said source of heat and said grid spaced in a manner to afford a browning of said food by said source of heat;
    support means for said heat source disposed inside said enclosure means; and
    a pressure regulated steam generating chamber for holding a quantity of water, said steam generating chamber and said support means for said fuel constructed and arranged in a manner so that said fuel can surround said steam generating chamber and heat said water into steam and both said steam generator and said heat source positioned in an independent and direct flow path to said food.

2. The cooking apparatus of claim 1 wherein said support means for said heat source is defined in part by a basket member.

3. The cooking apparatus of claim 2 wherein said steam generating chamber is positioned in the center of said basket member.

4. The cooking apparatus of claim 1 wherein said steam generating chamber includes a base member for connection with a water supply means to provide a constant supply of water.

5. The cooking apparatus of claim 2 wherein said steam generating chamber includes a base member for connection with said basket member.

6. The cooking apparatus of claim 1 wherein said steam generating chamber includes a floating lid.

7. The cooking apparatus of claim 2 wherein said heat source is charcoal and surrounds said steam generating chamber.

8. The cooking apparatus of claim 1 wherein said enclosure means includes a cover member having at least two lateral handles.

9. The cooking apparatus of claim 1 wherein said apparatus is housed in a modular cooking unit including storage areas surrounding said apparatus.

10. The cooking apparatus of claim 1 wherein said heat source is defined by noncombustible rock in combination with said steam generating chamber and gas.

11. An automatic temperature and pressure steam generating chamber for use in conjunction with an apparatus for barbecuing and cooking food comprising:

enclosure means for housing and supporting a source of heat and a grid for cooking said food;

wall means defining a receptacle for water disposed inside said enclosure means;

a lid member constructed and arranged to be positioned over said wall means in an upward direction;

retention means mounted in said wall means and constructed and arranged to permit limited movement of said lid member; and means to mount said chamber in conjunction with said heat source.

12. The steam generating chamber as defined in claim 11 wherein a source of water is connected to said chamber.

* * * * *